(12) United States Patent
Kim et al.

(10) Patent No.: US 6,877,130 B2
(45) Date of Patent: Apr. 5, 2005

(54) APPARATUS AND METHOD FOR GENERATING SUB-CODES TO A TURBO-ENCODER

(75) Inventors: Min-Koo Kim, Suwon-shi (KR); Jae-Sung Jang, Kwachon-shi (KR)

(73) Assignee: Samsung Electronics Co. Ltd. (KR)

( * ) Notice: Subject to any disclaimer, the term of this patent is extended or adjusted under 35 U.S.C. 154(b) by 430 days.

(21) Appl. No.: 09/981,934

(22) Filed: Oct. 17, 2001

(65) Prior Publication Data

US 2002/0144205 A1 Oct. 3, 2002

(30) Foreign Application Priority Data

Oct. 21, 2000 (KR) .................................. 10-2000-62151

(51) Int. Cl.$^7$ ............................................ H03M 13/03
(52) U.S. Cl. ..................................................... 714/790
(58) Field of Search ........................................ 714/790

(56) References Cited

U.S. PATENT DOCUMENTS

| 5,978,365 A | * | 11/1999 | Yi | 370/331 |
| 6,519,732 B1 | * | 2/2003 | Li | 714/755 |
| 6,665,833 B1 | * | 12/2003 | Tong et al. | 714/790 |

FOREIGN PATENT DOCUMENTS

JP          2000-068862        3/2000

OTHER PUBLICATIONS

Rowitch, D.N.; Milstein, L.B.; On the performance of hybrid FEC/ARQ systems using rate compatible punctured tubo (RCPT) codes, IEEE Transactions on Communications, vol.: 48, Issue: 6, Jun. 2000, pp.: 948–959.*

Acikel, O.F.; Ryan, W.E.; High rate turbo codes for BPSK/QPSK channels, Conference Record IEEE International Conference on Communications, vol.: 1, Jun. 7–11, 1998, pp.: 422–427.*

Acikel, O.F.; Ryan, W.E.; Punctured turbo-codes for BPSK/QPSK channels, IEEE Transactions on Communications, vol.: 47, Issue: Sep. 9, 1999, pp.: 1315–1323.*

Shidong Zhou; Yan Yao; High rate turbo code using unevenly punctured convolutional constituent code, Fifth Asia–Pacific Conference on Communications and Fourth Optoelectronics and Communications Conference, vol.: 1, Oct. 18–22, 1999, pp.: 751–754.*

* cited by examiner

Primary Examiner—Joseph D. Torres
(74) Attorney, Agent, or Firm—Dilworth & Barrese LLP

(57) ABSTRACT

Provided is an apparatus and method for generating an initial puncturing matrix from which a first sub-code is produced in a communication system. The apparatus includes a turbo encoder for generating information symbols and first and second parity symbols for the input of an information bit stream and a sub-code generator for generating sub-codes from the information symbols and the first and second parity symbols using puncturing matrices. The method comprises the steps of selecting as many information symbols as a number of columns in the initial puncturing matrix from the information symbols output from the turbo encoder, if a difference between the number Ns of selected symbols in the initial puncturing matrix and the number of the columns in the initial puncturing matrix is equal to or greater than a number of component encoders in the turbo encoder, and selecting as many first and second parity symbols as the difference.

10 Claims, 6 Drawing Sheets

APPARATUS AND METHOD FOR GENERATING SUB-CODES TO A TURBO-ENCODER

PRIORITY

This application claims priority to an application entitled "Apparatus and Method for Generating Codes in Communications System" filed in the Korean Industrial Property Office on Oct. 21, 2000 and assigned Ser. No. 2000-62151, the contents of which are hereby incorporated by reference.

BACKGROUND OF THE INVENTION

1. Field of the Invention

The present invention relates generally to an apparatus and method for generating codes in a data communications system, and in particular, to an apparatus and method for generating complementary codes with use of turbo codes in a communications system employing a retransmission scheme.

2. Description of the Related Art

In general, a system using a retransmission scheme (e.g., hybrid ARQ [Automatic Repeat Request]) performs soft combining to improve transmission throughput. The soft combining techniques are divided into packet diversity combining and packet code combining. These two combining schemes are usually called soft packet combining. Although the packet diversity combining scheme is suboptimal in performance relative to the packet code combining scheme, it is favorable due to easy implementation when performance loss is low.

A packet transmission system uses the packet code combining scheme to improve transmission throughput. That is, a transmitter transmits a code with a different code rate at each packet transmission. If an error is detected from the received packet, a receiver requests a retransmission and performs soft combining between the original packet and a retransmitted packet. The retransmitted packet may have a different code from the previous packet. The packet code combining scheme is a process of combining received N packets with a code rate R to a code with an effective code rate of R/N prior to decoding, to thereby obtain a coding gain.

With regard to the packet diversity combining scheme, on the other hand, the transmitter transmits a code with the same code rate R at each packet transmission. If an error is detected from the received packet, the receiver requests a retransmission and performs soft combining between the original packet and the retransmitted packet. The retransmitted packet has an identical code to that in the previous packet. In this sense, the packet diversity combining scheme can be considered symbol averaging on a random channel. The packet diversity combining scheme reduces noise power by averaging the soft outputs of received symbols and achieves such a diversity gain as offered by a multipath channel because the same code is repeatedly transmitted on a fading channel. However, the packet diversity combining scheme does not provide such an additional coding gain as obtained according to a code structure in the packet code combining scheme.

Due to implementation simplicity, most packet communication systems have used the packet diversity combining scheme, which is under study for application to the synchronous IS-2000 system and the asynchronous UMTS system. The reason is that the existing packet communication systems have used convolutional codes and even packet code combining does not offer a great gain when convolutional codes with a low code rate are used. If a system with R=1/3 supports retransmission, there is not a wide difference in performance between the packet code combining scheme and the packet diversity combining scheme. Thus, the packet diversity combining scheme is selected considering implementation complexity. However, the use of turbo codes as forward error correction codes (FEC) requires a different packet combining mechanism because the turbo codes are designed as error correction codes to have performance characteristics very close to the "Shannon Channel Capacity Limit" by iterative decoding and their performance varies obviously with the coding rates unlike convolutional codes. Therefore, it can be concluded that packet code combining is feasible for a packet communication system using turbo codes in a retransmission scheme to achieve the goal of optimum performance.

SUMMARY OF THE INVENTION

It is, therefore, an object of the present invention to provide an apparatus and method for generating sub-codes for optimal code combination in a retransmission system using turbo codes.

It is another object of the present invention to provide an apparatus and method for generating complementary codes using turbo codes in a communications system.

The above and other objects can be achieved by providing an apparatus and method for generating sub-codes from turbo codes in a communications system. In the sub-code generating apparatus, a turbo encoder generates information symbols, first parity symbols, and second parity symbols for the input of an information bit stream and a sub-code generator generates sub-codes from the information symbols, the first parity symbols, and the second parity symbols using puncturing matrixes. Here, the number of the sub-codes is identical to the number of the puncturing matrixes. To generate an initial puncturing matrix for the first sub-code, the sub-code generator selects as many information symbols as the number of columns in the initial puncturing matrix from the information symbols from the turbo encoder, if the difference between the number Ns of selected symbols in the initial puncturing matrix and the number of the columns in the initial puncturing matrix is equal to or greater than the number of component encoders in the turbo encoder. Then, the sub-code generator selects as many first and second parity symbols as the difference in such a way that the number of the selected first parity symbols is equal to or greater than the number of the selected second parity symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The present invention proposes a method of generating sub-codes for optimal packet combining in a retransmission system using turbo codes and a system that selectively employs a packet code combining scheme and a packet diversity combining scheme according to the data rates. The advantages and performance gain of the proposed system will be described.

First, there will be given a description of the operation of the system that selectively uses the packet code combining scheme and the packet diversity scheme combining according, to the data rates.

In a system using R=1/5 turbo codes, for example, packet code combining is applied until the overall code rate of codes produced by soft-combining of retransmitted packets reaches 1/5. For the subsequent retransmitted packets, packet diversity combining and then packet code combining are performed. If the first packet is transmitted at a data rate of 1/3, the required redundancy symbols are provided at a retransmission request to make the overall code rate 1/5. Thus, when a receiver receives both packets, the overall code rate becomes 1/5. Each of the following packets is repeated prior to transmission and the receiver performs packet diversity combining and then packet code combining on the retransmitted packets at the code rate 1/5.

Figure 1:
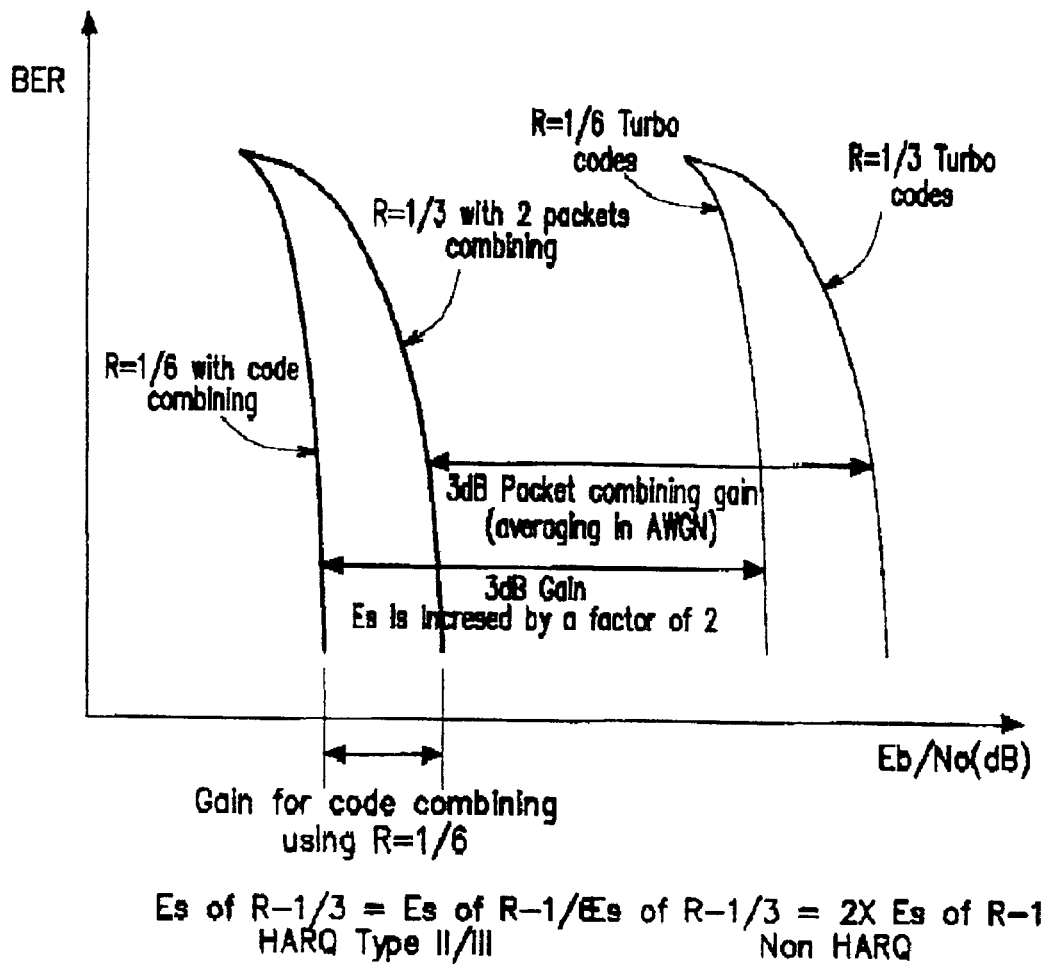
FIG. 1 is a graph showing the performance difference between packet code combining and packet diversity combining in a packet data system using turbo codes.

FIG. 1 is a graph showing the performance difference between packet code combining and packet diversity combining in the case of turbo codes. As shown in FIG. 1, a turbo code with a low data rate of 1/6 exhibits a greater performance gain than a turbo code with a high code rate of 1/3 with the same symbol energy Es and obtains a performance gain of 3 dB from the packet code combining. Consequently, generation of R=1/3 turbo codes by packet code combining of R=1/6 sub-codes produces a gain that turbo codes with a code rate lower than 1/3 exhibits and a gain that code combining of different codes offers, contemporaneously.

More specifically, for the same code symbol energy Es and the same given code rate, turbo codes provide performance close to the "Shannon Channel Capacity Limit" according to the code rates only if iteration decoding is fully implemented, unlike convolutional codes. It is known that a turbo code with a low code rate offers a greater performance gain than a turbo code with a high code rate with the same code symbol energy Es. For example, when R=1/3 is reduced to R=1/6, the performance difference can be estimated by analyzing a change in the "Shannon Channel Capacity Limit". The reason for assuming the same symbol energy irrespective of R=1/3 or 1/6 for the curves of FIG. 1 is that the same symbol energy Es is used for each retransmission in a hybrid ARQ system.

If an R=1/3 code is repeated once and the two codes are packet-diversity-combined on an AWGN (Additive White Gaussian Noise) channel, a maximum gain of 3 dB is obtained in terms of a symbol energy-to-noise ratio (Es/No). The same is the case with an R=1/6 code. Thus, a performance curve for the R=1/3 turbo code shifts to the left in parallel by a +3 dB scale due to a packet diversity combining gain and a performance curve for the R=1/6 turbo code also shifts to the left in parallel by a +3 dB scale when the same symbol energy is given. Here, the performance curves are derived with respect to the energy-to-noise ratio (Eb/No) which is measured to compare code performances according to the code rates. As a consequence, the difference between the turbo code performance curves is equivalent to the performance difference between the packet diversity combining and the packet code combining. The performance difference according to the code rates can be estimated from the "Shannon Channel Capacity Limit" and a minimum performance difference can be obtained using a minimum required signal-to-noise ratio (SNR).

In a system using turbo codes with a code rate R and a very large encoder block size L, a minimum Eb/No required to provide an error-free channel is expressed as $$Eb/No > (4^R - 1)/2R \tag{1}$$

According to the above equation, the minimum required Eb/No in AWGN at each code rate for the turbo codes is listed in Table 1 below. In Table 1, a typical Eb/No indicates a required Eb/No for a bit error rate (BER) below 0.00001 when the encoding block size L of the turbo codes is 1024.

TABLE 1

| Code rates | Required Eb/No (dB) | Typical Eb/No (dB) for BER = $10^{-5}$ |
|---|---|---|
| 3/4 | 0.86 | 3.310 |
| 2/3 | 0.57 | 2.625 |
| 1/2 | 0.00 | 1.682 |
| 3/8 | −0.414 | 1.202 |
| 1/3 | −0.55 | 0.975 |
| 1/4 | −0.82 | 0.756 |
| 1/5 | −0.975 | 0.626 |
| 1/6 | −1.084 | 0.525 |
| 0 | −1.62 | NA |

As shown in Table 1, required Eb/No are 0.86, 0.57, 0.0, −0.414, −0.55, −0.82, −0.975, and −1.084 dB respectively, for the code rates of 3/4, 2/3, 1/2, 3/8, 1/3, 1/4, 1/5, and 1/6. An at least 0.53 dB performance difference exists between a system using R=1/3 code and a system using R=1/6 code. This is a minimum performance difference based on the "Shannon Channel Capacity Limit". Considering implementation of a real decoder and system environment, the difference becomes wider. From a simulation, approximately 1.12 dB performance difference was observed between a system using packet code combining for R=2/3 codes and a system using packet diversity combining for the R=2/3 codes.

Table 2 shows the performance difference between packet code combining and packet diversity combining after one retransmission in a system with a sub-code code rate of 2/3. As shown in Table 2, a minimum performance difference is 1.12 dB and the packet code combining scheme produces a higher performance gain in the system using turbo codes.

TABLE 2

Figure 2:
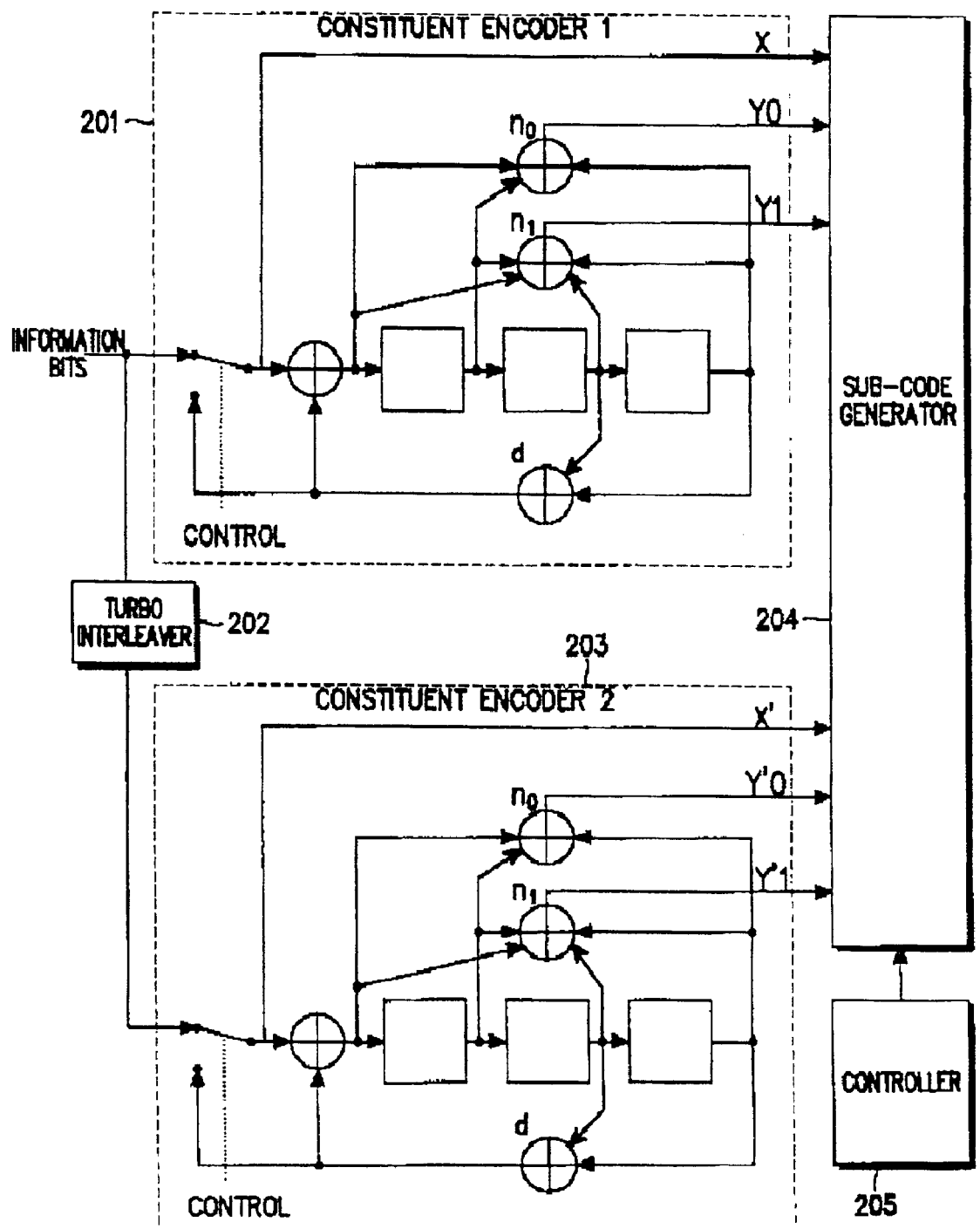
FIG. 2 is a block diagram of a sub-code generating apparatus according to an embodiment of the present invention.

| Items | Packet combining | Code combining |
|---|---|---|
| Mother code rate $R_m$ | 1/3 (X, Y0, Y'0) in FIG. 2 | 1/3 (X, Y0, Y'0) in FIG. 2 |
| Block size (L) | 496 | 496 |
| Maximum number of iterations | 8 | 8 |
| Number of transmissions | 2 | 2 |
| Actual Tx code rate Re for each transmission | 2/3 (by puncturing) | 2/3 (by puncturing) |
| Redundancy selection | Identical pattern for all transmissions. | Different pattern for all transmissions. |
| Soft combining | Packet diversity combining | Packet code combining |
| Gain through retransmissions | Symbol repetition gain | Coding gain for low rate codes |
| Minimum required Eb/No in Table 1 | +0.57 (dB) | R-2/3 +0.57 (dB) R-2/6 −0.55 (dB) |
| Required Eb/No at 2nd retransmissions | +0.57–3.0 (dB) | −0.55–3.0 (dB) |
| Relative performance gain | 0 | 1.12 dB (= 0.57 + 0.55) |
| Simulated relative gain (@ BER = $10^{-5}$) | 0 | 2.5 (dB) |

As described above, the packet code combining scheme shows excellent performance in the retransmission system using turbo codes. Therefore, the present invention provides a sub-code generating method for optimal packet code combining in the retransmission system using turbo codes. Generation of sub-codes for packet code combining according to a predetermined rule produces the aforementioned code combining gain and maximizes the performance of a system requesting sub-codes of the same size for each retransmission.

FIG. 2 is a block diagram of a sub-code generating apparatus using turbo codes according to an embodiment of the present invention. As shown in FIG. 2, the sub-code generating apparatus includes a turbo encoder, a sub-code generator 204, and a controller 205.

First, with regard to the turbo encoder, a first component encoder (or a first constituent encoder) 201 encodes an input information bit stream and outputs first code symbols, i.e., information symbols X and first parity symbols Y0 and Y1. An interleaver 202 interleaves the input information bit stream according to a predetermined rule. A second component encoder (or a second constituent encoder) 203 encodes the interleaved information bit stream and outputs second code symbols, i.e., information symbols X' and second parity symbols Y'0 and Y'1. Thus, the output symbols of the turbo encoder are the first and second code symbols. Since the information symbols X' generated from the second component encoder 203 are not transmitted in reality, the code rate of the turbo encoder is 1/5.

The sub-code generator 204 generates sub-codes from the first and second code symbols received from the first and second component encoders 201 and 203 by puncturing and repetition under the control of the controller 205. The controller 205 stores puncturing (and repetition) matrixes generated from algorithms shown in FIGS. 4, 5 and 6 and outputs symbol selection signals for the puncturing matrixes to the sub-code generator 204. Then, the sub-code generator 204 selects a predetermined number of code symbols within a predetermined puncturing range according to the symbol selection signals.

The reference characters as used here, X, Y0, Y1, Y'0, and Y'1 are defined as follows.

Figure 4:
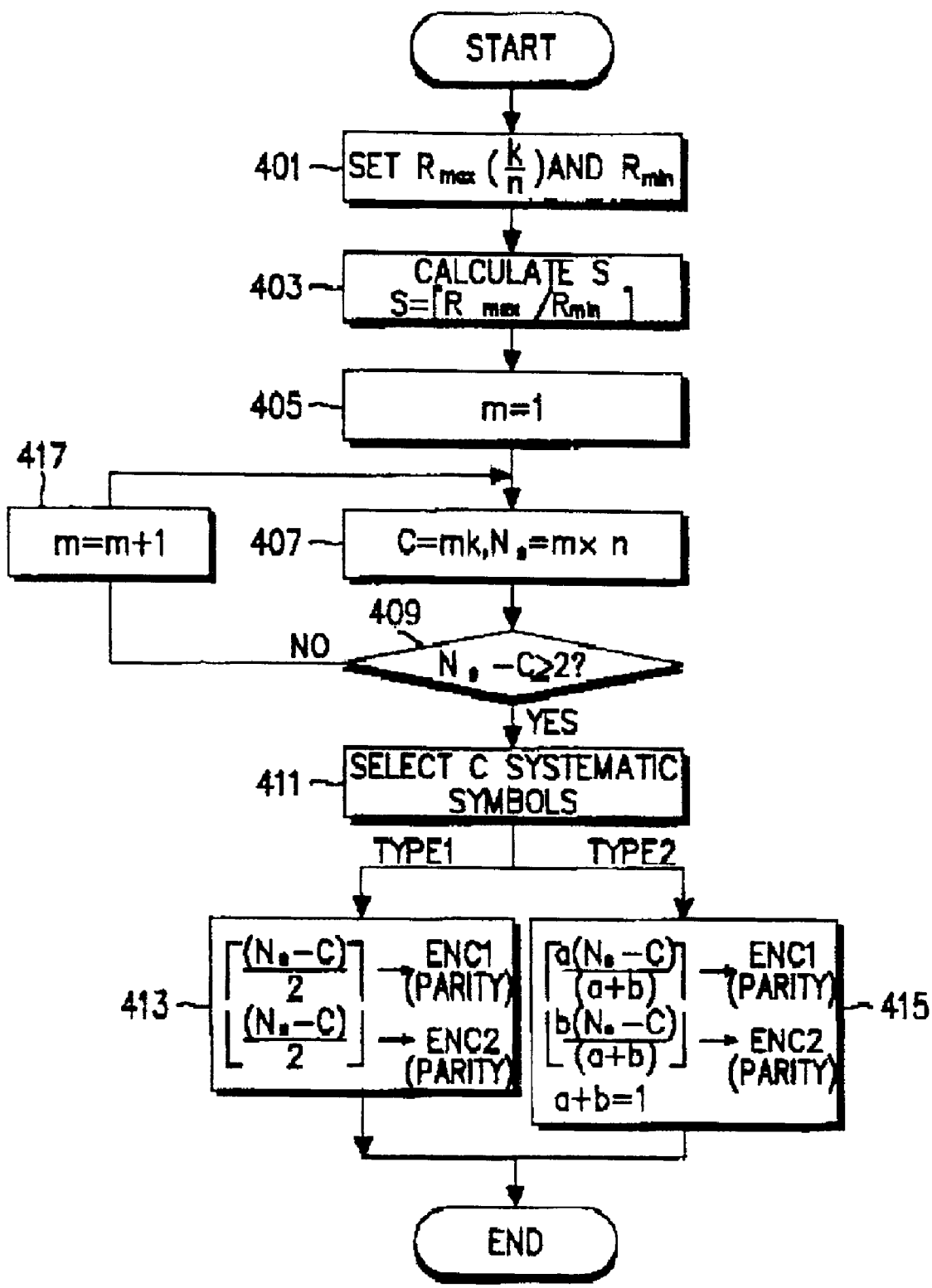
FIG. 4 is a flowchart illustrating a method of generating the first sub-code in the sub-code set of quasi-complementary turbo codes according to the embodiment of the present invention.
Figure 5:
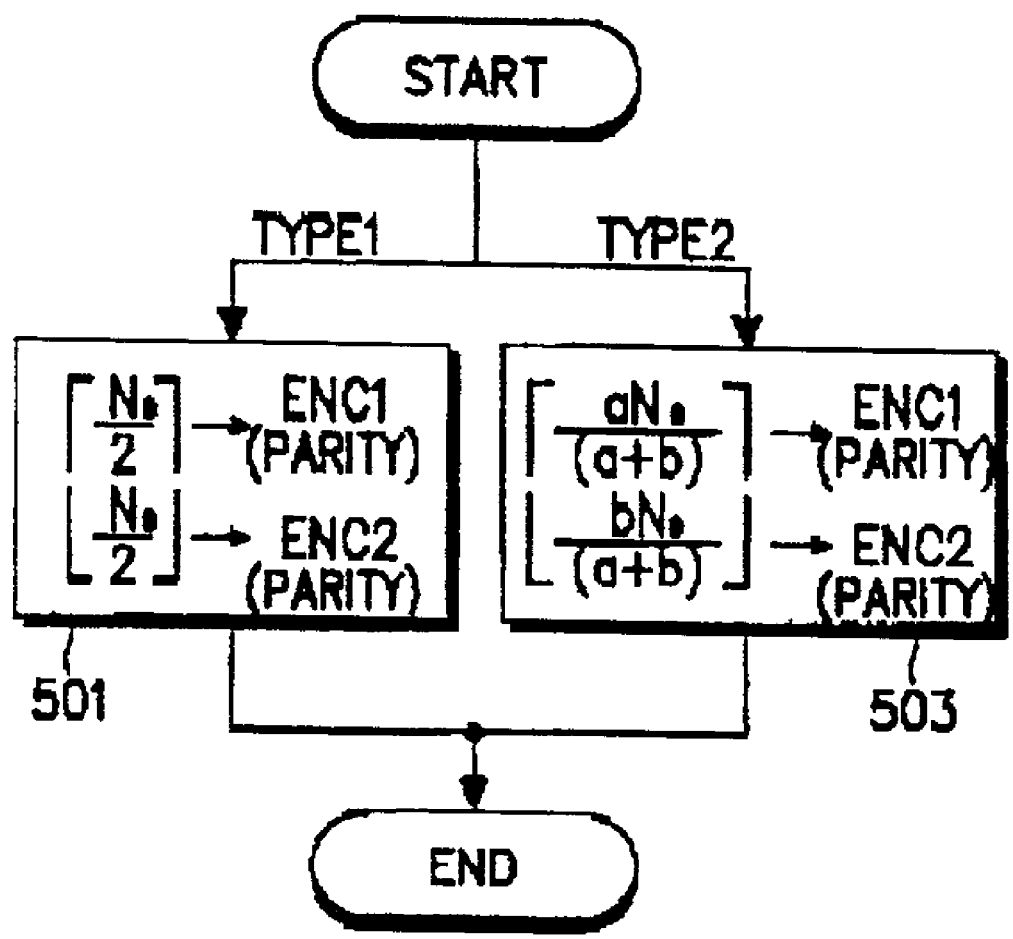
FIG. 5 is a flowchart illustrating a method of generating middle sub-codes in the sub-code set of the quasi-complementary turbo codes according to the embodiment of the present invention.
Figure 6:
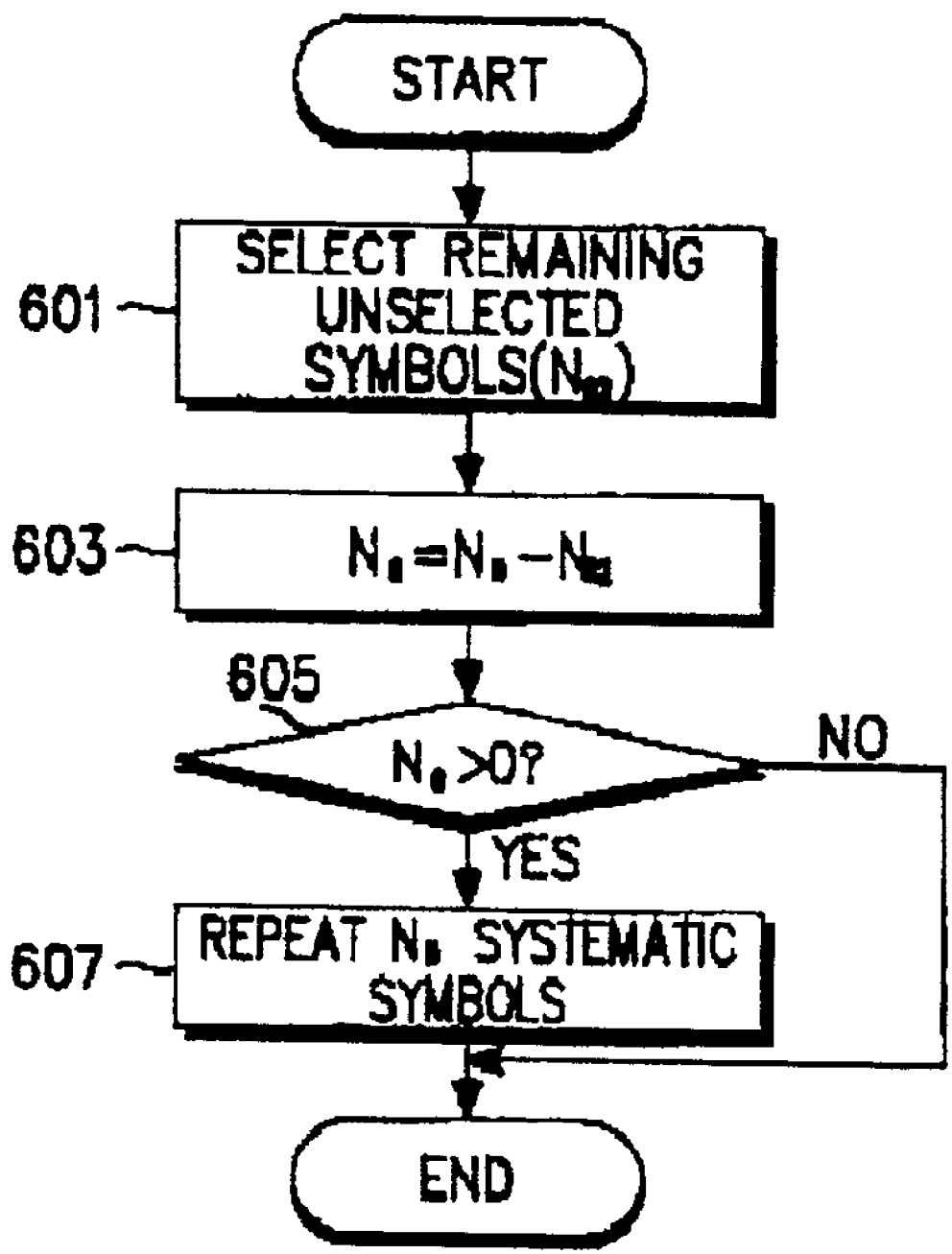
FIG. 6 is a flowchart illustrating a method of generating the last sub-code in the sub-code set of the quasi-complementary turbo codes according to the embodiment of the present invention.

X: systematic code symbol or information symbol
Y0: redundancy symbol from the upper component encoder of the turbo encoder
Y1: redundancy symbol from the upper component encoder of the turbo encoder
Y'0: redundancy symbol from the lower component encoder of the turbo encoder
Y'1: redundancy symbol from the lower component encoder of the turbo encoder FIGS. 4, 5 and 6 are flowcharts illustrating sub-code (or puncturing matrix) generating procedures according to the embodiment of the present invention. Specifically, FIG. 4 illustrates a procedure of generating the first sub-code $C_0$ in a sub-code set, FIG. 5 illustrates a procedure of generating middle sub-codes $C_1$ to $C_{s-2}$ in the sub-code set, and FIG. 6 illustrates a procedure of generating the last sub-code $C_{s-1}$ in the sub-code set.

Hereinbelow, ENC1 (referred to as first code symbols) indicate the information symbols X and the first parity symbols Y0 and Y1 output from the first component encoder 201 and ENC2 (referred to as second code symbols) indicate the second parity symbols Y'0 and Y'1 output from the second component encoder 203.

Referring to FIG. 4, a maximum code rate (Rmax) available to a transmitter is set in step 401. This value is mostly given according to the data rate used in the system. A minimum code rate (Rmin) is set to be an integer-multiple of Rmax (=k/n). Here, k is the number of input symbols and n is the number of output symbols. Although Rmin can be determined arbitrarily, it is usually 1/6, 1/7 or lower Because a coding gain is saturated due to the decrease of code rates at or below R=1/7 in turbo codes. In addition, the real code rate, i.e., mother code rate (R) of a decoder in a receiver, is determined. R is set to be greater than Rmin.

In real system implementation, Rmax and Rmin are preset. In some sense, Rmax is the code rate of the sub-codes to be generated and Rmin is a target code rate after code combining of the sub-codes. In general, Rmin is the code rate of an encoder in the transmitter.

In step 403, the number of sub-codes (S) is calculated by the following equation using Rmax and Rmin. Here, the number of the sub-codes or the number of puncturing matrixes is a minimum integer exceeding the ratio of Rmax to Rmin.

$$S=[R_{max}/R_{min}] \quad (2)$$

where [*] represents a minimum integer equal to or larger than *.

A variable m is set to an initial value of 1 in step 405 and C (=m×k) is determined in step 407. C is the number of the columns of each puncturing matrix, determined by Rmax. For example, for Rmax=3/4, C can be 3, 6, 9, . . . and is set to a minimum available value for the first sub-code to be transmitted. Here, C is set to 3 for Rmax=3/4.

In step 407, the number of symbols to be selected from the puncturing matrix, Ns, is calculated by multiplying the variable m by the code length i.e., the number of code symbols n from Rmax=k/n. Ns is the number of selected symbols or the number of selected positions in each puncturing matrix and calculated by C/Rmax.

In step 409, (Ns−C) is compared with the number of the component encoders of the turbo encoder in the transmitter. The present turbo encoder is generally provided with two component encoders. Thus, it is supposed that two component encoders are used. It is determined whether (Ns−C) is 2 or greater in step 409 because the turbo encoder has two component encoders connected in parallel with the interleaver interposed as shown in FIG. 2 unlike conventional encoders using other single codes. In other words, at least one parity symbol from each component encoder must be transmitted after the information symbols are all transmitted in order to preserve the characteristics inherent in the turbo encoder.

If (Ns–C) is less than 2, only one symbol is selected from either the first parity symbol set or the second parity symbol set. From the perspective of turbo codes, either case may face problems. In the first case, sub-codes generated without second parity symbols are not turbo codes but convolutional codes with constraint length K=4 from an encoder having only the first component encoder and offers no interleaver gain that is available in the turbo encoder. On the other hand, in the second case, transmission of only systematic symbols without parity symbols from the first component encoder results in sub-codes with a code rate of 1. This is equivalent to an uncoded system without any coding gain. Accordingly, (Ns–C) must be equal to or greater than 2 to provide turbo encoder performance.

If (Ns–C) is equal to or greater than 2 in step 409, C systematic information symbols are selected from the puncturing matrix in step 411 and the other symbols are selected according to a predetermined type. For type 1, the other symbols are selected from the first and second parity symbols by Eq. (3) in step 413. The number of selected first parity symbols is equal to or greater than that of selected second parity symbols. For example, if the number of the other symbols, (Ns–C), is 3, first and second parity symbols are selected by Eq. (3) and then one more symbol is selected from the first parity symbols.

$$\lceil (Ns-C)/2 \rceil \quad ENC1(parity) \qquad (3)$$
$$\lfloor (Ns-C)/2 \rfloor \quad ENC2(parity)$$

where $\lfloor * \rfloor$ represents a maximum integer equal to or less than *.

For type 2, the other symbols are selected from the first and second parity symbols by Eq. (4) in step 415. If a and b are given as symbol distribution rates for the first parity symbols and the second parity symbols, respectively, as many symbols as a minimum integer equal to or larger than the ratio of a(Ns–C) to (a+b) are selected from the first parity symbols and as many symbols as a maximum integer equal to or less than the ratio of b(Ns–C) to (a+b) are selected from the second parity symbols.

$$\lceil a(Ns-C)/(a+b) \rceil \quad ENC1(parity) \qquad (4)$$
$$\lfloor b(Ns-C)/(a+b) \rfloor \quad ENC2(parity)$$

where a+b=1 and a and b indicate the symbol distribution ratios for ENC1 and ENC2, respectively.

If the condition given in step 409 is not satisfied, that is, (Ns–C) is less than 2, the variable m is incremented by 1 in step 417 and the procedure returns to step 407. The purpose of step 409 is to determine whether sub-codes capable of preserving the nature of turbo codes can be generated within the present puncturing range (the size of the puncturing matrix). If the nature of the turbo codes cannot be preserved, the puncturing range is enlarged in step 417.

As described above, the initial puncturing matrix is so constructed that all information symbols are selected and at least one symbol is selected from each of the first and second parity symbol sets in the turbo encoder.

Now there will be given a description of a middle puncturing matrix generation method referring to FIG. 5. By repeating the procedure of FIG. 5, puncturing matrices $C_1$ to $C_{s-2}$ are generated.

Referring to FIG. 5, step 501 or 503 is performed according to a predetermined type. For type 1, Ns symbols are selected from the first and second parity symbol sets by Eq. (5) in step 501. Ns is the product of m and n given from Rmax (=k/n). The number of selected first parity symbols is equal to or greater than that of selected second parity symbols. Here, unselected symbols from the previous puncturing matrices are selected.

$$\lceil Ns/2 \rceil \quad ENC1(parity) \qquad (5)$$
$$\lfloor Ns/2 \rfloor \quad ENC2(parity)$$

For type 2, Ns symbols are selected from the first and second parity symbol sets according to predetermined ratios by Eq. (6) in step 503. If a and b are given as symbol distribution ratios for the first parity symbols and the second parity symbols, respectively, as many symbols as a minimum integer equal to or greater than the ratio of a(Ns) to (a+b) are selected from the first parity symbols and as many symbols as a maximum integer equal to or less than the ratio of b(Ns) to (a+b) are selected from the second parity symbols. Here, unselected symbols from the previous puncturing matrices are selected.

$$\lceil a(Ns)/(a+b) \rceil \quad ENC1(parity) \qquad (6)$$
$$\lfloor b(Ns)/(a+b) \rfloor \quad ENC2(parity)$$

A last puncturing matrix $C_{s-1}$ generating method will be described below referring to FIG. 6.

Referring to FIG. 6, the remaining unselected symbols from the previous puncturing matrices are all selected in step 601. The number of the selected symbols is defined as Ns2. In step 603, a new Ns is defined by (Ns–Ns2). Since symbols at all positions are selected from the puncturing matrices in the process of the operations shown in FIGS. 4, 5 and 6, the new Ns is the number of symbols to be repeatedly selected in step 605, it is determined whether the new Ns is greater than 0. If the new Ns is 0, the procedure ends. If it is greater than 0 in step 605, then in step 607 as many symbols as the new Ns are selected repeatedly from the information symbols. In other words, the selected symbols are transmitted repeatedly.

The above-described sub-code generation method according to the present invention will be made clear below with specific numerical citations.

For Rmax=3/4 and R=1/5, Rmin=1/6 and S=6/(4/3)= 4.5→5. Thus, five puncturing matrices are produced.

$$\{C_0, C_1, C_2, C_3, C_4\}: Rmax=3/4.$$

Since the code rate of sub-codes is 3/4 and the number of sub-codes is 5, the sub-codes have a code rate 3/20 ((1/S)× Rmax=(1/5)×(3/4)=3/20) after code combining. This implies that for 3 information bits, a receiver receives 20 code symbols. However, since 15 symbols are generated from S×n=5×4=20 and S×k=5×3=15, 5 symbols among the 15 symbols are repeatedly transmitted. The repeated symbols are preferably information symbols. In the above example, if an information symbol X is repeated once in each sub-code, a decoder receives turbo codes with R=1/5 in which information symbols occur twice for each of S sub-codes when S sub-codes are all received.

The resulting sub-codes from the procedures shown in FIGS. 4, 5 and 6 are a kind of complementary codes, but they are not in a strict sense of the term because repeated symbols exist and each sub-code exhibits a different characteristic. In view of the sub-codes being produced from turbo codes, they will be called quasi-complementary turbo codes (QCTCs). A hybrid ARQ system using QCTCs employs the following retransmission scheme.

The hybrid ARQ system is the major example using packet code combining. Packet code combining is available to the present hybrid ARQ systems, HARQ Type I, Type II, and Type III. In these systems, a retransmission technique can be implemented using QCTCs. If a transport unit (TU) is defined as an information bit block being a basic unit for packet transmission, one sub-code $C_i$ is selected for each TU transmission in the hybrid systems.

A retransmission unit and an initial transmission TU can be the same or different in size. For an initial transmission and each retransmission, the following QCTC set is used.

From a QCTC $C_q$ having a code set size S, a mother code C can be reconstructed, or a new code $C_q$ with a lower code rate than the mother code rate Rm can be generated by combining (or code-combining) sub-codes $C_i$ (i=0, 1, 2, ..., S−1). Here, the mother code has a minimum code rate available in the encoder. Then, the QCTC is defined as Original code C with code rate R=Rm or code C with code rate R<Rm $$= \bigcup_{i=0}^{S-1} C_i \quad (7)$$

where S is the number of sub-codes with a code rate of Ri and Rm is the mother code rate.

The operation of a system transmitting TUs of the same size for an initial transmission and each retransmission using a QCTC will be described. Needless to say, the transmission scheme using different TUs can also be supported in the present invention. Here, the number of sub-codes S is 4 and the mother code rate R is 1/5.

(Step 1) Transmission is performed on a TU basis and a sub-code $C_i$ of the QCTC is transmitted at the initial transmission and each retransmission.

(Step 2) When the overall code rate of codes produced by soft combining of the initially transmitted and retransmitted packets is greater than 1/5, each sub-code $C_i$ of the QCTC is transmitted in the order of $C_0, C_1, C_2, \ldots, C_{S-1}$ at each retransmission request. This is packet code combining.

(Step 3) When the overall code rate of codes produced by soft combining of the initially transmitted and retransmitted packets is less than or equal to 1/5, each sub-code $C_i$ of the QCTC is repeatedly transmitted in the order of $C_0, C_1, C_2, \ldots, C_{S-1}$ at each retransmission request. This is packet diversity combining.

(Step 4) The QCTC set size can be an arbitrary value, determined by the mother code rate. For R=1/5 and a sub-code code rate of 2/3 for retransmission, up to four sub-codes can be used.

Table 3 below lists QCTC sets for forward traffic channel packet data rates that are expected to be available in the present IS-2000 1XEVDV system. Here, a mother code rate R=1/5 and a sub-code code rate R=2/3, 1/3, or 1/6.

TABLE 3

| Set size S | Code set | Sub-code rate set | Data rates |
|---|---|---|---|
| 1 | {$C_0$} | $C_0$: $R_0$ = 1/6 | 307.2 kbps |
| | | | 153.6 kbps |
| | | | 76.8 kbps |
| | | | 38.4 kbps |
| | | | 19.2 kbps |
| 2 | {$C_0, C_1$} | $C_0$: $R_0$ = 1/3 | 1228.8 kbps |
| | | $C_1$: $R_1$ = 1/3 | 921.6 kbps |
| | | | 614.4 kbps |
| | | | 307.2 kbps |
| 4 | {$C_0, C_1, C_2, C_3$} | $C_0$: $R_0$ = 2/3 | 2457.6 kbps |
| | | $C_1$: $R_1$ = 2/3 | 1843.2 kbps |
| | | $C_2$: $R_2$ = 2/3 | 1228.8 kbps |
| | | $C_3$: $R_3$ = 2/3 | |

As shown in Table 3, for a sub-code code rate of 1/6 less than the mother code rate 1/5, the same code $C_0$ is used at each transmission. For a sub-code code rate of 1/3, greater than the mother code rate 1/5, different code $C_0$ and $C_1$, are used at each transmission. In this case, the code set size S is 2. For a sub-code code rate of 2/3, greater than the mother code rate 1/5, different code $C_0, C_1, C_2, C_3$ are used at each transmission. The code set size S is 4. When S sub-codes are all transmitted, the receiver can recover the mother code rate R and obtain the maximum coding gain offered by the encoder.

Table 4 below illustrates examples of puncturing matrices for each sub-code code rate.

TABLE 4

| Code rates | $C_0$ | $C_1$ | $C_2$ | $C_3$ |
|---|---|---|---|---|
| R = 1/6 | $\begin{vmatrix} X \\ Y0 \\ Y1 \\ Y'0 \\ Y'1 \end{vmatrix} = \begin{vmatrix} 2 \\ 1 \\ 1 \\ 1 \\ 1 \end{vmatrix}$ | NA | NA | NA |
| R = 1/3 | $\begin{vmatrix} 1 \\ 1 \\ 0 \\ 1 \\ 0 \end{vmatrix}$ | $\begin{vmatrix} 1 \\ 1 \\ 0 \\ 1 \\ 0 \end{vmatrix}$ | NA | NA |
| R = 2/3 | $\begin{vmatrix} 0 & 1 \\ 1 & 0 \\ 0 & 0 \\ 0 & 1 \\ 0 & 0 \end{vmatrix}$ | $\begin{vmatrix} 1 & 0 \\ 0 & 1 \\ 0 & 0 \\ 1 & 0 \\ 0 & 0 \end{vmatrix}$ | $\begin{vmatrix} 0 & 1 \\ 0 & 0 \\ 1 & 0 \\ 0 & 0 \\ 0 & 1 \end{vmatrix}$ | $\begin{vmatrix} 1 & 0 \\ 0 & 0 \\ 0 & 1 \\ 0 & 0 \\ 1 & 0 \end{vmatrix}$ |
| R = 2/3 | $\begin{vmatrix} 1 & 1 & 1 & 1 \\ 0 & 0 & 0 & 0 \\ 0 & 0 & 0 & 0 \\ 0 & 0 & 1 & 0 \\ 0 & 0 & 0 & 0 \end{vmatrix}$ | $\begin{vmatrix} 0 & 0 & 0 & 0 \\ 0 & 1 & 1 & 1 \\ 0 & 0 & 0 & 0 \\ 1 & 1 & 0 & 1 \\ 0 & 0 & 0 & 0 \end{vmatrix}$ | $\begin{vmatrix} 0 & 0 & 0 & 0 \\ 0 & 0 & 0 & 0 \\ 1 & 1 & 0 & 1 \\ 0 & 0 & 0 & 0 \\ 0 & 1 & 1 & 1 \end{vmatrix}$ | $\begin{vmatrix} 1 & 1 & 1 & 1 \\ 0 & 0 & 0 & 0 \\ 0 & 0 & 1 & 0 \\ 0 & 0 & 0 & 0 \\ 1 & 0 & 0 & 0 \end{vmatrix}$ |

As shown in Table 4, when a rate 1/5 turbo code is used as a mother code and a rate 2/3 sub-code is generated with code symbols output for 4 information bits, 20 code symbols are generated from the 4 information bits. The rate 2/3 sub-code is generated by puncturing 14 symbols among the 20 symbols. For packet diversity combining of such sub-codes, $C_0$ produced from the above puncturing matrices is repeatedly transmitted at each retransmission request. On the other hand, for packet code combining, a different code symbol is transmitted at each retransmission request. After transmitting all sub-codes $C_0$, $C_1$, $C_2$, $C_3$ in the set, the packet diversity combining is executed. For HARQ Type III using packet code combining, full code symbols of the mother code are decoded after four transmissions occur.

Meanwhile, "1"s in the puncturing matrices of Table 4 indicate that the symbols at the positions are selected or transmitted and "0"s indicate that the symbols at the positions are punctured. A "2" indicates that the symbol at the position occurs twice. The puncturing (and repetition) matrices are designed to satisfy the following conditions.

(Condition 1) An information symbol X is repeated in a sub-code of a QCTC when repetition is used.

(Condition 2) If the information symbol X is repeated in a sub-code of the QCTC using repetition, the repeating period is set to be a minimal constant in the QCTC having all sub-codes in combination.

(Condition 3) If puncturing is used, redundancy symbols except the information symbol X are punctured if possible in the sub-codes of the QCTC.

(Condition 4) If puncturing is used, redundancy symbols except the information symbol X are uniformly punctured if possible in the sub-codes of the QCTC.

A puncturing and repetition matrix with R=1/6 satisfying the above conditions will be described. Decoding is carried out after the symbols X that occur twice are soft-combined and so the real code rate for the decoder is 1/5. The rate 1/5 code, having the energy of the information symbol X increased, has an improved performance, as compared to a rate 1/5 code having a uniform symbol energy across the symbols. In other words, the most appropriate symbol to be repeated is an information symbol. It can be said that the puncturing and repetition matrices shown in Table 4 are constructed in such a way that information symbol energy is increased through uniform repetition of the information symbols.

In Table 4, for R=1/6, the sequence of transmission code symbols is given as $C_0$: X, X, Y0, Y1, Y'0, Y'1, X, X, Y0, Y1, Y'0, Y'1, . . .

Because six code symbols are generated for the input of one information symbol, the code rate of the sub-code is 1/6.

For R=1/3, the sequences of transmission code symbols are given as $C_0$: X, Y0, Y'0, X, Y0, Y'0, X, Y0, Y'0, X, Y0, Y'0 . . .
$C_1$: X, Y1, Y'1, X, Y, Y'1, X, Y1, Y'1, X, Y, Y'1, . . .

Because three code symbols are generated for the input of one information symbol, the code rate of the sub-code is 1/3. A different code is transmitted at each transmission due to the use of a different puncturing matrix. After soft combining of $C_0$ and $C_1$, X occurs twice and each of Y0, Y1, Y'0 and Y'1 occurs once. Thus, the decoder with a code rate 1/5 can be used in this case and the puncturing matrices satisfy the above-described conditions, ensuring performance.

In the first case with R=2/3 of Table 4, the sequence of transmission code symbols are given as $C_0$: Y0, X, Y'0, Y0, X, Y'0, Y0, X, Y'0, Y0, X, Y'0, . . .
$C_1$: X, Y'0, Y0, X, Y'0, Y0, X, Y'0, Y0, X, Y'0, Y0, . . .
$C_2$: Y1, X, Y'1, Y1, X, Y'1, Y1, X, Y'1, Y1, X, Y'1, . . .
$C_3$: X, Y'1, Y1, X, Y'1, Y1, X, Y'1, Y1, X, Y'1, Y1, . . .

Because three code symbols are generated for the input of two information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. Thus, the decoder with a code rate 1/5 can be used also in this case as for R=1/6 and the puncturing matrices satisfy the above-described conditions, ensuring performance.

In the second case with R=2/3 of Table 4, the sequence of transmission code symbols are given as $C_0$: X, Y0, X, X, Y'0, X, X, Y0, X, X, Y'0, X, X, Y0, X, X, Y'0, X, . . .
$C_1$: Y'0, Y0, Y'0, Y0, Y0, Y'0, Y'0, Y0, Y'0, Y0, Y0, Y'0, . . .
$C_2$: Y1, Y1, Y'1, Y'1, Y1, Y'1, Y1, Y1, Y'1, Y'1, Y1, Y'1, 
$C_3$: X, Y'1, X, X, Y'1, X, X, Y'1, X, X, Y'1, X, . . .

Because six code symbols are generated for the input of four information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. Thus, the decoder with a code rate 1/5 can be used also in this case as for R=1/6 and the puncturing matrices satisfy the above-described conditions, ensuring performance.

Figure 3:
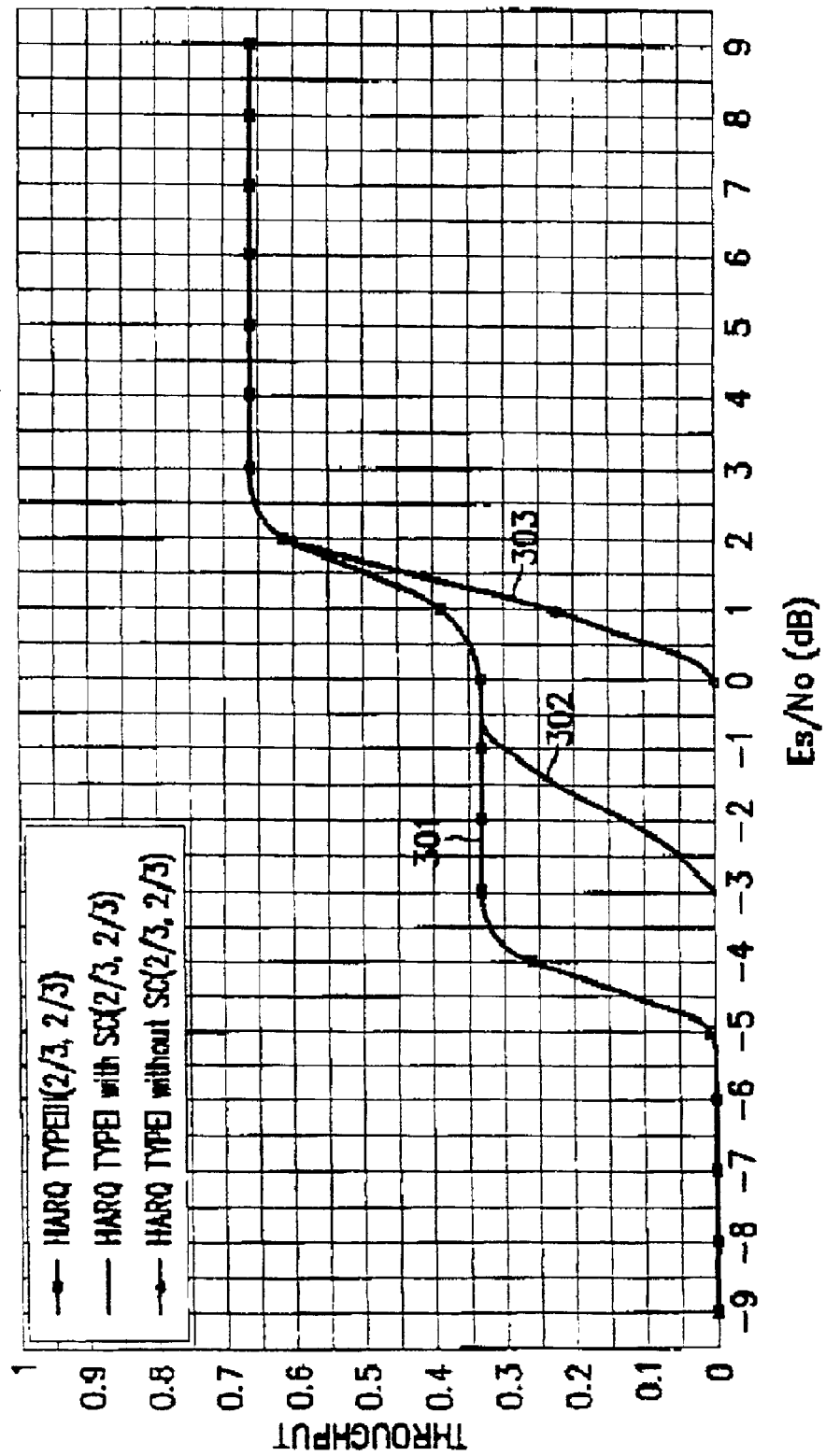
FIG. 3 is a graph showing the performances of a retransmission scheme without using sub-codes, a retransmission scheme implementing diversity combining with sub-codes, and a retransmission scheme implementing code combining with sub-codes.

FIG. 3 is a graph showing a comparison between the performance of HARQ using packet code combining and the performance of HARQ using packet diversity combining in terms of data throughput for a QCTC with R=2/3 and S=4 according to the present invention. As shown in FIG. 3, an HARQ 301 using packet code combining for the QCTC and an HARQ 302 using packet diversity combining for the QCTC show better performance than an HARQ 303 without the QCTC. For the same real time data throughput (e.g., 0.25), about −4 dB of Es/No is required in the HARQ 301, about −1.3 dB in the HARQ 302, and about 1 dB in the HARQ 303. Consequently, the use of the QCTC according to the present invention ensures a higher data throughput with less symbol energy.

As described above, sub-codes generated for optimum packet code combining according to a predetermined rule remarkably improves transmission throughput in a packet retransmission system using turbo codes according to the present invention.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of generating a first sub-code to be transmitted by selecting a predetermined number of symbols from information symbols and first and second parity symbols in a communication system having a turbo encoder for generating information symbols, first parity symbols, and second parity symbols for the input of an information bit stream, the predetermined number of symbols being Ns symbols, comprising the steps of:

selecting all the information symbols, if a difference between Ns and a number of columns of a puncturing matrix is equal to or greater than a number of component encoders in the turbo encoder; and selecting as many first and second parity symbols as the difference, a number of the selected first parity symbols being equal to or greater than a number of the selected second parity symbols.

2. The method of claim 1, further comprising the step of increasing the puncturing range by an integer multiple if the difference is less than the number of the component encoders.

3. The method of claim 1, further comprising the step of selecting the Ns symbols from unselected first and second parity symbols in the first sub-code in generating a second sub-code, wherein the number of the selected first parity symbols is equal to or greater than the number of the selected second parity symbols.

4. The method of claim 3, further comprising the step of selecting remaining unselected first and second parity symbols in the other sub-codes except for a last sub-code and repeating (Ns–Ns2) information symbols, Ns2 being a number of the other unselected parity symbols in generating the last sub-code.

5. The method of claim 1, wherein the communication system uses the sub-codes in a hybrid ARQ (Automatic Repeat Request) scheme.

6. The method of claim 1, wherein the number Ns of selected symbols is determined by C/Rmax, C being a number of columns in a puncturing matrix and Rmax being a code rate of the sub-code.

7. An apparatus for generating a sub-code in a communication system, comprising:

a turbo encoder for encoding an input information bit stream with a given code rate and generating information symbols, first parity symbols, and second parity symbols; and a sub-code generator for generating a first sub-code to be transmitted by selecting all information symbols and selecting as many first and second parity symbols as a difference between a predetermined number Ns of symbols to be selected and a number of columns of a puncturing matrix, a number of the selected first parity symbols being equal to or greater than a number of the selected second parity symbols, if the difference is equal to or greater than a number of component encoders in the turbo encoder.

8. The apparatus of claim 7, wherein the sub-code generator generates a second sub-code by selecting Ns symbols from the first and second parity symbols without selecting information symbols, the number of the selected first parity symbols being equal to or greater than the number of the selected second parity symbols.

9. The apparatus of claim 8, wherein the sub-code generator generates a last sub-code by selecting remaining unselected first and second parity symbols in the other sub-codes except for the last sub-code and repeating (Ns–Ns2) information symbols, Ns2 being a number of the other unselected parity symbols in the other sub-codes.

10. The apparatus of claim 7, wherein the sub-code generator generates the sub-codes by increasing the puncturing range by an integer multiple if the difference is less than the number of the component encoders.

* * * * *